United States Patent [19]

Engler et al.

[11] Patent Number: 4,695,608
[45] Date of Patent: Sep. 22, 1987

[54] CONTINUOUS PROCESS FOR MAKING POLYMERS HAVING PENDANT AZLACTONE OR MACROMOLECULAR MOIETIES

[75] Inventors: David A. Engler, Woodbury; Anthony R. Maistrovich, Lake Elmo, both of Minn.

[73] Assignee: Minnesota Mining and Manufacturing Company, St. Paul, Minn.

[21] Appl. No.: 867,519

[22] Filed: May 27, 1986

Related U.S. Application Data

[63] Continuation of Ser. No. 594,555, Mar. 29, 1984, abandoned.

[51] Int. Cl.⁴ .......................................... C08F 265/04
[52] U.S. Cl. .................................. 525/308; 525/279; 525/304; 525/309; 526/260; 526/321; 526/329.2; 526/88
[58] Field of Search ............... 525/308, 309, 279, 304; 526/260, 321, 329.2

[56] References Cited

U.S. PATENT DOCUMENTS

| Re. 24,906 | 12/1960 | Ulrich | 206/59 |
|---|---|---|---|
| 2,530,409 | 11/1950 | Stober et al. | 260/83.5 |
| 2,745,824 | 5/1956 | Melchore | 260/59 |
| 2,973,286 | 2/1961 | Ulrich | 206/59 |
| 3,141,868 | 7/1964 | Fivel | 260/85.5 |
| 3,234,303 | 2/1966 | Bild et al. | 260/876 |
| 3,522,214 | 7/1970 | Crawford | 260/75 |
| 3,583,950 | 6/1971 | Kollinsky et al. | 260/78 |
| 3,725,115 | 4/1973 | Christenson et al. | 117/93.31 |
| 3,753,958 | 9/1973 | Wingler et al. | 260/78.5 |
| 3,786,116 | 1/1974 | Milkovich et al. | |
| 3,821,330 | 6/1966 | Free | 260/876 |
| 3,842,059 | 10/1974 | Milkovich et al. | 260/93.5 |
| 3,963,679 | 6/1976 | Ullrich et al. | 260/75 |
| 4,042,768 | 8/1977 | Muller et al. | 526/65 |
| 4,125,696 | 11/1978 | Kenneth | 526/73 |
| 4,181,752 | 1/1980 | Martens et al. | 427/541 |
| 4,304,705 | 12/1981 | Heilmann et al. | 526/263 |
| 4,487,897 | 12/1984 | Matsuoka et al. | 526/88 |
| 4,554,324 | 11/1985 | Husman et al. | 525/301 |

FOREIGN PATENT DOCUMENTS

| 58-53975 | 3/1983 | Japan . |
| 58-53974 | 3/1983 | Japan . |
| 58-53973 | 3/1983 | Japan . |
| 58-53970 | 3/1983 | Japan . |
| 58-53969 | 3/1983 | Japan . |
| 58-53907 | 3/1983 | Japan . |
| 58-53901 | 3/1983 | Japan . |
| 58-168610 | 10/1983 | Japan . |
| WO83/01617 | 5/1983 | PCT Int'l Appl. . |
| 1218147 | 4/1971 | United Kingdom . |
| 1347088 | 4/1977 | United Kingdom . |
| 1121418 | 7/1986 | United Kingdom . |

(List continued on next page.)

Primary Examiner—Paul R. Michl
Attorney, Agent, or Firm—Donald M. Sell; James A. Smith; Douglas B. Little

[57] ABSTRACT

A bulk polymerization process for free radical polymerization of vinyl monomers and alkenyl azlactones or macromolecular monomers (e.g. functionalized polystyrene), in a wiped surface reactor is disclosed. Referring to FIG. 1; monomer streams 5 (after purification and silica gel column 2), and 7 and macromer or azlactone 8 are combined with free radical initiator 9 to form a premix 16. Pump 18 transfers the premix stream 22 through static mixer 24 into a wiped surface reactor 27. The reactor can be a counter rotating twin screw extruder which produces polymer stream 36 without the need of solvent and using residence times much shorter than prior art solution or emulsion processes.

Some unique pressure sensitive adhesive acrylate polymers have been produced. They are believed to have a relatively high degree of branching. The bulk polymerization process permits the manufacture of pressure sensitive adhesive articles by extruding directly from the twin screw extruder onto a substrate.

34 Claims, 3 Drawing Figures

OTHER PUBLICATIONS

Ehehalt, W. J., "Continuous Production of Hot Melt Adhesives", *Adhesives Age,* Aug. 1975.

Thiele, W., *"Introducing Counter-Rotating Intermeshing Twin-Screw Dispersion Compounders and Reactors",* American Leistritx Extruder Corp., 5/27/80.

Mack, W. A., "Bulk Polymerization in Screw-Conveyer Reactors", *Chemical Engineering,* May 15, 1972.

Mack, W. A., "Use of Screw Machinery for Continuous Polymerization and Polycondensation Reactions", *Polym. Prepr. Am. Chem. Soc.* (1972).

Levy, S., Plastic Extrusion Technology Handbook, Industrial Press, 1981, pp. 40, 53.

Rauwendal, C. J., "Analysis and Experimental Evaluation of Twin Screw Extruders", *Polymer Engineering and Science,* Nov. 1981.

Tadmor, Z., "Continuous Polymerization in Extruder Reactor", *Polymer Letters,* edition, vol. 11, 1973.

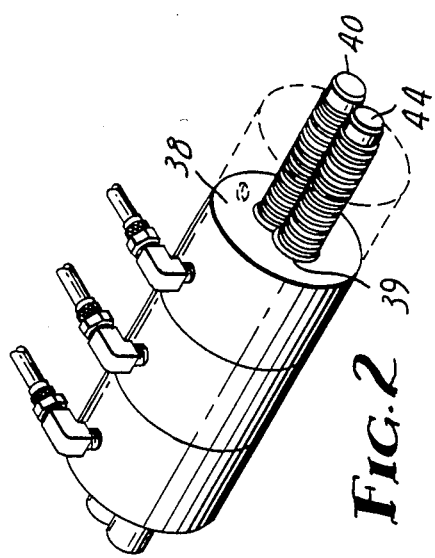
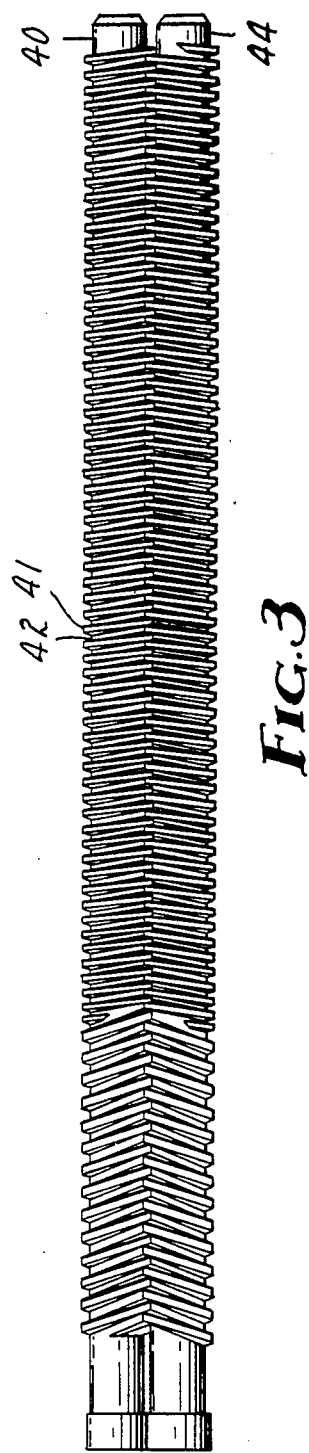

CONTINUOUS PROCESS FOR MAKING POLYMERS HAVING PENDANT AZLACTONE OR MACROMOLECULAR MOIETIES

This is a continuation of application Ser. No. 594,555 filed Mar. 29, 1984 now abandoned.

TECHNICAL FIELD

This invention relates to a continuous process for the polymerization of free radical polymerizable vinyl monomers together with certain azlactones and functionalized polymers. More particularly, it relates to the application of wiped surface reactors, such as counter rotating twin screw extruders, to such polymerization processes.

BACKGROUND

The prior art teaches the manufacture of pressure sensitive adhesive (PSA) compositions by solution and emulsion polymerizations. PSA produced by solution polymerization may be diluted with a solvent and coated in a thin layer on a backing material by processes well known in the adhesives art. In coating articles such as tapes with solution polymer PSAs, elaborate drying ovens have been required to carry away the volatile solvents after coating. Furthermore, to prevent the solvents from being vented to the atmosphere with resulting pollution and solvent loss, expensive solvent recovery equipment has been required. Safety hazards in such operations are also severe, as the solvents are flammable and precautions must be taken to avoid explosive mixtures in the oven and exhaust systems.

While emulsion polymerization has potentially eliminated the problems associated with handling and evaporation of flammable solvents (e.g., when adhesive is applied as a latex to a tape backing) the heat of vaporization of water must be supplied to dry the coating, and essentially the same drying equipment as used in solution coating must be employed. Direct coating of latices can give a coating with increased moisture sensitivity due to residual emulsifiers, and there are backings and substrates which are sensitive to moisture. Latex requires a higher drying temperature than solution polymers, and latex can lack stability in storage and handling, forming coagulum and plugging equipment.

Currently, glass bubble filled acrylate adhesive is sold as a positionable mounting adhesive. A positionable PSA should meet the following criteria:
(a) The adhesive should be such that articles to be bonded have limited adhesion initially and can be peeled off without adverse effect; i.e., a piece of paper could be placed on the adhesive and have limited holding strength and yet be peeled off without tearing.
(b) The adhesive and the article to be bonded, once in the proper position, must form a good bond in a short period of time (hours), or a good bond should be formed immediately through the use of pressure.
(c) The adhesive, once the bond has formed, must have resistance to shear under load.
(d) The adhesive should have adequate peel adhesion once the bond is formed.

U.S. Pat. No. 4,304,705 describes the preparation of radiation curable polymeric coatings, including coatings made from acrylate polymers, from ethylenically unsaturated azlactone polymers having pendant azlactone groups. These polymers and coatings are said to be useful in imaging systems such as are used in the graphic arts.

Graft copolymers having macromolecular polystyrene side chains and various acrylate backbone polymers are described in U.S. Pat. No. 3,786,116, see especially examples 30-37 which are preparations of such copolymers by solution, suspension and emulsion reactions.

DISCLOSURE OF INVENTION

This invention provides a new process for continuous, bulk polymerization of vinyl compounds together with azlactones or macromolecular monomers (e.g. methacrylate terminated polystyrene). Particularly, pressure sensitive adhesives can be made and directly coated onto useful articles without the need for solvents.

The invention can be summarized as a process of polymerizing one or more free radical polymerizable vinyl compounds, which may be in the liquid or solid state, with one or more additional compounds selected from the group consisting of alkenyl azlactones and macromers represented by the general formula X—(Y)$_{n1}$—Z wherein;

X is a copolymerizable vinyl group;
Y is a divalent linking group where $n_1$ can be 0 or 1; and
Z is a monovalent polymer moiety having a general formula

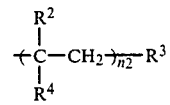

wherein $R^2$ is hydrogen or a lower alkyl group, $R^3$ is a lower alkyl group, $n_2$ is an integer from 40 to 500 and $R^4$ is a monovalent radical selected from the group consisting of

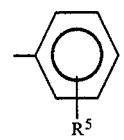

and —CO$_2$R$^6$ wherein $R^5$ is hydrogen or a lower alkyl group and $R^6$ is a lower alkyl group; which process comprises:
(a) continuously feeding to a wiped surface reactor raw materials which comprise at least one vinyl compound, at least one additional compound as described above, and at least two initiators for free radical polymerization, under the following conditions:
(i) all raw materials being fed substantially free of oxygen, and
(ii) any raw material fed to the reaction as a liquid having a viscosity less than about 4000 centipoise being fed under a pressure at least as high as the vapor pressure of the combined raw materials at the temperature to which the exotherm of the free radical polymerization brings them in the reactor;
(b) reacting the raw materials to desired conversion; and (c) continuously withdrawing a polymeric material from the reactor.

The terms macromer and macromolecular monomer as used above refer to functionally terminal or functionalized polymers, that is, polymeric backbone molecules having functional vinyl groups attached thereto. Macromers may be prepared by the method disclosed in U.S. Pat. Nos. 3,786,116 (see e.g. columns 5–14 and examples 7 and 8) and 3,842,059. The Z moiety by itself preferably has a glass transition temperature greater than 20° C., a weight average molecular weight in the range of about 2,000 to 30,000, and is essentially unreactive under copolymerization conditions. For purposes of this description, the term lower alkyl group, when used to describe ligands such as $R^5$, means an alkyl group of less than 10 carbon atoms.

For purposes of this description, the term alkenyl azlactone means a compound selected from the class of 2-alkenyl-1,3-oxazolin-5-ones (also called 2-alkenyl-5-oxazolines in the literature) having the general formula:

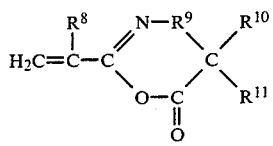

wherein
$R^8$ is hydrogen, chloride, or a methyl group;
$R^9$ is a single bond on a methylene or ethylene group, the last two of which can have subistituents comprising an alkyl group having 1 to 6 carbon atoms or a phenyl group;
$R^{10}$ and $R^{11}$ are independently hydrogen, an alkyl or cycloalkyl group having 1 to 12 carbon atoms, an aryl or aralkyl group having 6 to 12 carbon atoms, or $R^{10}$ and $R^{11}$ taken together with the carbon atom to which they are attached to form a 5- to 12-membered carbocyclic ring.

These azlactone monomers copolymerize free radically with acrylic monomers to yield polymers having pendant azlactone moieties.

This invention avoids the problems associated with both solution and emulsion polymerization by using bulk polymerization and it overcomes certain difficulties that arise from the nature of bulk polymerization. One main difficulty is that of mixing and proper heat transfer caused by poor thermal conductivity of the viscous reaction mass. Other difficulties associated with bulk polymerization are the transport of the viscous reaction mass and loss of control over molecular weight distribution. Good mixing, transport, and control over molecular weight distribution are attained through use of the wiped surface reactor.

A wiped surface reactor comprises a shell or vessel which contains at least one rotor having a wiping portion located close to the inside surface of the shell and a root portion which is spaced substantially further from the shell than the wiping portion. As the rotor is rotated, the wiping portion passes close enough to the inside surface of the shell to clean the surface and form a seal when the reactor contains monomer and/or polymer but not so close as to cause permanent deformation of either the rotor or shell. It is necessary that the root surface of the rotor also be wiped or cleaned continuously during operation of the reactor.

Intermeshing twin screw extruders may be used as wiped surface reactors. The screws comprise the rotors and the flight lands comprise the wiping portion, while the screw root surface between the flight lands comprises the root surface. Although corotating twin screw extruders may be used, counter-rotating twin screw extruders are preferred. The counter-rotating extruder acts as a positive displacement pump conveying the reacting stream, and it also behaves like a series of small mixing zones or continuous stirred tank reactors. The counter-rotating twin screw extruder also gives good control over the reaction temperature. The counter-rotating twin screw extruder made by Leistritz GmBH of Nurnberg, West Germany is suitable for this process.

The term "substantially free of oxygen" means having an oxygen concentration sufficiently low that it is not a serious inhibitor to the polymerization.

Feeding a low viscosity (e.g. 1 centipoise) liquid to an extruder entails certain problems. One such problem is forming a plug to prevent channeling of the liquid down the extruder during start-up. However, the inventive process overcomes such problems by adding a pressure feed system with limited volumetric transport rate when liquid monomers are fed to the wiped surface reactor and by using a multi-part (i.e. more than one) initiator. This pressure mentioned in part (ii) of the description above is usually at least about 200 kPa absolute. The process can be made to work without pressure feed or with only one initiator, but both improvements are preferred.

Some unique compositions made by the above-described process are included within the scope of this invention. These compositions include acrylate polymers which are comprised of a major portion derived at least one alkyl ester of acrylic or methacrylic acid (the alkyl group containing from about one to 14 carbon atoms) such as methyl methacrylate, ethylacrylate, 2-ethylhexyl acrylate, 2-ethylhexyl methacrylate, lauryl methacrylate, methyl butyl acrylate, n-butyl acrylate, butyl methacrylate, isooctylacrylate, n-octyl methacrylate and mixtures thereof, and a minor portion comprising pendant moieties derived from alkenyl azlactones or macromers as defined by the formulas previously stated.

Typical macromers are: acrylate terminated polystyrene and methacrylate terminated polystyrene (molecular weight about 10,000–15,000). For such macromers, the $R^4$ substituents of the macromer formula given earlier is phenyl and $R^5$ is hydrogen.

The acrylate polymer also preferably includes, in addition to the alkenyl azlactone or macromer, a minor portion of monomeric units derived from at least one modifying monomer such as acrylic acid, methacrylic acid, acrylamide, acrylonitrile, methacrylonitrile, vinyl acetate, N-substituted acrylamides (e.g. N-isopropyl acrylamide), hydroxyacrylates, N-vinylpyrrolidone, maleic anhydride, styrene or itaconic acid. The acrylate PSA polymers of this invention are comprised of monomeric units of which about 70 to 99 percent are preferably derived from the alkyl esters of acrylic acid or methacrylic acid. In addition, when isomeric or branched acrylic acid esters (e.g. 2-ethylhexyl acrylate) are used as monomers, a relatively higher degree of polymer branching and cross-linking can be obtained.

The advantages of the inventive process are attributable to both the inherent cost benefits from solvent-free continuous processing and the impact on the total process of manufacturing articles coated with PSAs. For example, when prior art PSAs are coated out of solution, some substrates are sensitive to the solvents and/or heat used. This requires initially coating a PSA solution onto a liner (e.g. release paper) and drying the adhesive while it is on the liner, and afterward, transferring the adhesive from the liner to the desired substrate or base. Using the inventive process, the PSA can be coated onto the desired substrate immediately after exiting the wiped surface reactor, since there is, in most cases, no solvent to be driven off.

Prior art hot melt adhesives are made by: first either stripping off solvent (if adhesive is a solution polymer) or coagulating the polymer (if polymer is in a latex emulsion), and then heating the adhesive in a hot melt die. The inventive process may be used to convert certain monomers directly and extrude hot melt adhesive onto a substrate (e.g. a tape backing) at the end of the extruder, thus eliminating at least one step.

Another example is in processes for manufacturing pressure sensitive adhesive tape which have a drying step. The tape backing must necessarily have a relatively high strength in order to withstand the stress of travelling through the drying oven at high speeds and high temperatures. The inventive process would permit the use of lower cost backings by eliminating this necessity for high tensile stresses under high temperatures, since no drying step is required.

When alkenyl azlactones are used as monomers in the inventive process, the new process represents a method of preparing a 100% solids adhesive film with good positionability and displaying moderate to large increases in adhesion. Specifically, it has been found that when various acrylate PSA monomers are copolymerized with azlactones in the inventive process, the wiped-surface reactor yields an adhesive which can be hot melt coated and which has utility as a positionable adhesive. Small gel particles are produced in the wiped-surface reactor. These act in a similar manner to the glass bubbles in present commercial positionable acrylate adhesives. Adhesives containing such gel particles are positionable and offer advantages over glass bubbles. The gel particles are soft and deformable as opposed to the relatively rigid glass bubbles, and the gel particles offer a cost advantage over the use of glass bubbles in that the gel is prepared in situ and requires no subsequent compounding steps.

The incorporation of alkenyl azlactones or macromer into acrylate PSA's has been found to reinforce and improve the adhesives.

BRIEF DESCRIPTION OF THE DRAWINGS

FIG. 2 is a detail pictorial view of a section of the counter rotating twin screw extruder, item 27 in FIG. 1.

FIG. 3 shows a typical extruder screw profile for a counter rotating twin screw extruder useful in the process of this invention.

DETAILED DESCRIPTION

Process Description

Figure 1:
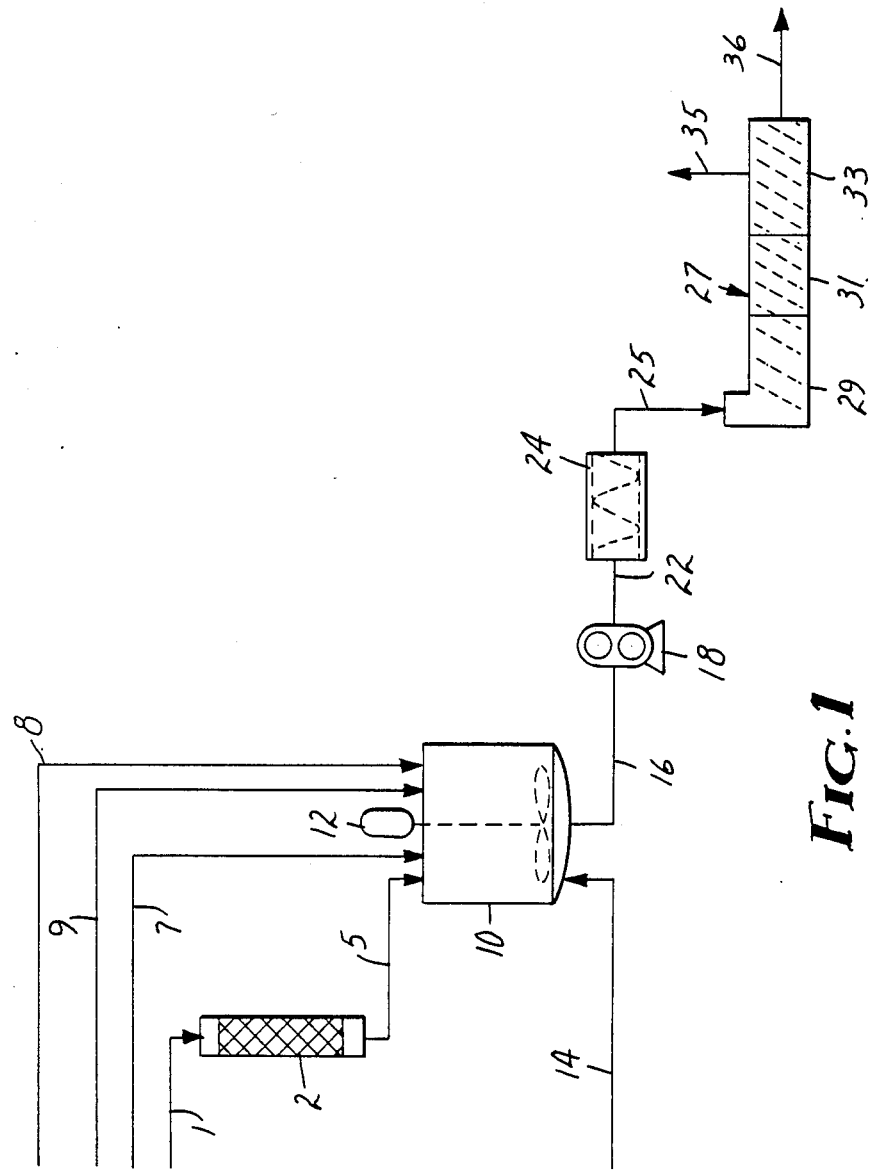
FIG. 1 is a diagramatic flow sheet representation of the process of the present invention. It is an exemplary embodiment, and the process is not limited to the arrangement shown. The symbols represent chemical unit operations and ancillary equipment such as spare pumps and valves have not been illustrated. Also, secondary process streams such as utility lines (e.g. cooling water) have been omitted.

FIG. 1 represents a flow sheet for an embodiment of the inventive process directed toward making an isooctylacrylate/acrylic acid/macromer terpolymer PSA. The flow sheet and corresponding description are applicable to the synthesis of isooctylacrylate/acrylic acid/alkenyl azlactone terpolymer as well. A stream 1 of isooctylacrylate monomer flows through a packed column 2 which is packed with an adsorbent such as silica gel. The effluent stream 5 leaving the packed column is mixed together with the comonomer stream 7 (acrylic acid), macromer (or alkenyl azlactone) stream 8, and the initiator represented by stream 9. All the major constituents are mixed together as a premix in premix tank 10 using agitator 12.

Macromer is normally a solid and may be added as a solid to the premix tank 10. Alternatively, it has been dissolved in isooctylacrylate stream 5 in a separate mixing step.

Although just one initiator stream 9 is shown, many possible free radical initiators are known to the art and may be used. Typical free radical polymerization initiators are: organic peroxides, such as benzoyl peroxide, cumene hydroperoxide, di-t-butyl peroxide, lauryl peroxide, azo-group initiators such as azobisisobutyronitrile, and redox type catalysts which produce free radicals. The initiator system may be a two or three part system which comprises a combination of reagents. One such initiator system is made up of one half methyltricaprylyl ammonium persulfate and one half 2,5-dimethyl-2,5-di(t-butylperoxY)hexane obtained as Lupersol 101 from Pennwalt Corporation.

Other viable initiators are: bis(4-t-butylcyclohexYl)-peroxydicarbonate (as posible substitute for the methyltricaprylyl ammonium persulfate); lauroyl peroxide (possible substitute for azobisisobutyronitrile); t-butyl perbenzoate, t-butyl hydroperoxide, 2,5-dimethyl-2,5-di-(t-butylperoxy)hex-3-yne and di-t-butyl diperoxyphthalate (all four being possible substitutes for 2,5-dimethyl-2,5-di(t-butylperoxy)hexane).

Typical concentrations for the initiator are from about 0.001 to 1.0 PHR (parts per hundred parts of monomer by weight).

Chain transfer agents and modifiers well known in the polymerization art may also be included in the premix to modify molecular weight or other polymer properties. Some chain transfer agents which will work in the inventive process are: carbon tetrabromide, hexabromoethane, bromotrichloromethane, 2-mercaptoethanol, t-dodecylmercaptan, isooctyl thioglycolate, cyclohexanone and cumene. The concentration of chain transfer agent is typically about 0.001 to 0.2 weight percent.

The premix is maintained under an inert (e.g. nitrogen) atmosphere in order to maintain the premix substantially free of oxygen. After the ingredients of the premix have been mixed together, the agitator 12 is turned off and inert gas stream 14 enters the premix tank, bubbling up through the premix and forming an inert gas blanket over the premix. In the experiments during which the inventive process was reduced to practice, premix tank 10 was made of polypropylene, and agitator 12 was made of metal and was removed from the tank after the initial mixing of the premix ingredients. This removal was a precaution against any adverse catalytic effects which long term exposure to metal might have had.

In many instances, the free radical reaction can take place without diluents, i.e. true bulk polymerization. However, the vinyl compounds or monomers may in some cases require a diluent to solubilize them as an aid to copolymerization. For example, acrylamides are dissolved in a small amount of a diluent in order to make them miscible with isooctylacrylate. Therefore, the inventive process includes within its scope the use of diluents which are nonreactive in the free radical polymerization being carried out. Such diluents usually comprise less than about 10 weight percent of the premix, and they may be selected from the normal diluents used in solution polymerization, such as: toluene, hexane, pentane, acetone, methyl ethyl ketone, methanol, t-butyl alcohol and isopropanol. Some of the diluents can also serve as chain transfer agents.

The premix is pumped from premix tank 10 via pipe 16 using gear pump 18. The discharge of pump 18, stream 22, flows through static mixer 24. The static mixer has a heating jacket which contains a heating medium to raise the temperature of the premix stream to a range of about 35° to 55° C. The preheated premix stream 25 flows from the static mixer to the inlet of the wiped surface reactor 27. Pump 18 is used to generate the pressure required for the pressure feed to the wiped surface reactor which is important for maintaining process stability.

A representative wiped surface reactor for use as the apparatus diagrammed in FIG. 1 is a twin screw extruder. It is important to realize that there can be a large viscosity gradient through the length of the wiped surface reactor from the inlet zone containing a relatively low viscosity (about 1 cps) liquid to the outlet end containing a very high viscosity PSA. The combination of the extruder screws and barrel together with the very high viscosity polymer mass toward the discharge end of the twin screw extruder cooperate to form a seal preventing the low viscosity liquid at the inlet end from leaking or channeling past the extruder screw flights.

Preferably, the counter-rotating twin screw extruder used is divided into sections as illustrated in FIG. 2. For example, the extruder screws 40 and 44 may be composed of a number of separate sections which may fit onto a common drive shaft by means of a keyway and which may be disassembled and rearranged in various orders and orientations. Thus, the screw may have one pitch in the inlet section, another pitch in the middle of the screw length and yet another pitch toward the exit end of the extruder. It is also possible to utilize some screw sections having one start or helix and other screw sections having multiple (i.e. two or three) starts. In addition, while most of the extruder screw sections are oriented to convey the material within the extruder toward the outlet end; one or more screw sections may be reversed (referred to as reversed sections), in order to increase mixing. Furthermore, the barrel 38 of a twin screw extruder may be divided into sections each of which may be either a heating section (i.e. a heating jacket) or a cooling section (i.e. jacket for circulating coolant) or both.

In developing the present process, the laboratory apparatus utilized was a cylindrical counter-rotating twin screw extruder (Leistritz model LSM 30.34GG) having nine barrel and screw sections plus a feed section each 120 mm long and a total length to diameter ratio (L/D) of about 35/1. Greater L/D ratios generally allow higher throughput for a given residence time. The extruder was flood fed, that is the channels of the screws were kept full.

FIG. 3 shows how the screw profile can change over the length of the extruder. The width of the flights 41 is preferably about the same as the width of the channel between flights. The orientation of the extruder screws in FIG. 3 is the same as represented for the extruder 27 in FIG. 1 and the extruder section shown in FIG. 2, that is inlet to the left and discharge end to the right.

It is the single start or single helix extruder screw elements shown in about the right half of FIG. 3 which perform the bulk of the conveying in the process. In the 34 mm diameter laboratory extruder, they were found to convey the reacting mass down the length of the extruder at a rate of about 6 mm per revolution of the screws. This relatively slow rate of advance permits high shear rates without short reaction residence times. The pitch of the flights in this section of the extruder was roughly 3.2°. It is believed that higher extruder rotational speeds result in improved heat transfer and mixing in the free radical polymerization reaction. In the laboratory extruder used in developing the inventive process, the channels defined by the flights 41 and the screw root surface 42 were roughly 3.5 mm wide and 4 mm deep toward the discharge end of the extruder.

As can be seen from FIG. 3 the feed area of the screw has a longer pitch in order to accomodate cleaning pellets which are used to clean the extruder after a reaction run.

Clearances between the inside of the barrel wall 39 and the flight lands of the screws should be in the range of about 0.25 to 0.5 mm. It is desired to have clearances as small as possible without causing deformation or seizing of the machine, since small clearances help to form the seal mentioned earlier. It is also felt that larger clearances cause the formation of more gel than is desirable.

In addition to the viscosity gradient down the length of the extruder which was mentioned earlier, there is also a density gradient.

The counter rotating twin screw extruder of FIG. 1 is divided into three polymerization zones 29, 31 and 33. In the first zone 29 the reaction initiation with methyltricaprylyl ammonium persulfate takes place, typically between about 55° and 100° C.. It is desired in this section to obtain rapid initiation and start building high molecular weight polymer. After the initiation period, it may be desired to activate a second initiator (e.g., azobisisobutyronitrile) and to increase temperature in the second zone 31. In this zone the reaction rate is quite rapid, going to about 90 percent conversion, and gives off a significant amount of heat which is removed from the cooled extruder barrel. At about 90 percent conversion, the reacting mass is a fairly viscous system and it is desirable to minimize viscosity by maintaining relatively high temperatures and using high shear extruder screw sections so that the remaining unreacted monomers can be contacted and reacted with the growing polymer chains in the third section 33.

The first initiator or initiators used in the reaction are effectively consumed, and in the third high temperature stage of the reaction, an initiator capable of operating at high temperatures such as 2,5-dimethyl-2,5-di(t-butylperoxy)hexane is preferably used.

It was found advantageous to have a heated hose on the outlet end of the extruder to convey the polymer into a product vessel or coating die. In fact, it was found that the reaction actually proceeded inside the hose which functioned as a tubular reactor, thus increasing the residence time.

Thus, the wiped surface reactor may discharge the polymeric material into a non-wiped surface reactor such as a tubular reactor or a single screw extruder. Using such a non-wiped surface reactor can allow an increase in residence time and throughput (production rate). In the process including the non-wiped surface reactor, the conversion in the wiped surface reactor would be somewhat less than the "desired conversion" mentioned earlier. Desired conversion will be reached at the discharge of the non-wiped surface reactor. The inlet viscosity of the reacting stream entering the non-wiped surface reactor must, however, be high enough so that shear stress at the wall can prevent accumulation of a stagnant layer of polymer. Free radical polymerizations will proceed until they are terminated by exposure to oxygen at the outlet end of the reactor.

Residence time distribution of the reactants in the wiped surface reactor is determined by the geometry of the reactor (e.g. screw geometry in a twin screw extruder), the chemistry of the reaction itself, the temperatures at which the extruder barrel sections are controlled, and the rotational speed of the rotor in the wiped surface reactor (e.g. speed of the extruder screws). In the development work which led to the inventive process, residence time in a counter-rotating twin screw extruder has varied from about 1 to 20 minutes, and extruder screw speed has varied between about 20 and 200 rotations per minute. Keeping other reaction conditions constant, the physical properties of the product polymer (inherent viscosity, percent insolubles, and molecular weight) can be changed by adjusting extruder screw speed.

The residence times which are typical of the inventive process represent a significant potential productivity increase in production operations, since the prior art processes for manufacturing pressure sensitive adhesives were typically about 18 hours for solution polymerizations and from about one to four hours for emulsion polymerizations.

In some reactions, there is a need for venting, and this is usually done near the discharge end of the extruder. In FIG. 1 a vent line 35 is shown and would be used in cases where venting was needed to prevent undesirable foaming of the polymer or to effect residual monomer removal. When the extruder is vented, a relatively long pitch screw section is used in the vent zone (e.g. zone eight of a nine-section extruder), and a vacuum (e.g. about 100 mbar or 10 kPa absolute pressure) may be applied to the vent.

Stream 36 on FIG. 1 represents the product polymer as it is discharged from the counter rotating twin screw extruder 27. Once it is exposed to the air, polymerization ceases. At this point, the product stream 36 may be directed into a storage vessel or to some further process step. For example, it may be pumped by a gear pump to a die for coating onto a backing or release material for purposes of making pressure sensitive adhesive articles, or it may be co-extruded with some backing material.

Alkenyl Azlactone Preparation

The preparation of alkenyl azlactone monomers is described in U.S. Pat. No. 4,304,705 at columns 15 and 16. In general, they are prepared as shown in the following flow chart.

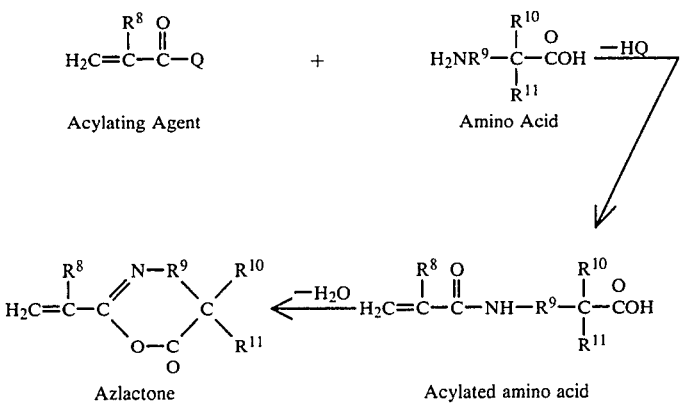

wherein $R^8$, $R^9$, $R^{10}$ and $R^{11}$ are the same as previously defined and Q is halogen, hydroxyl, an alkoxyl group or

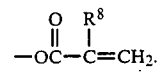

The synthesis of the azlactones has been fully discussed in the literature by:
(a) Y. Iwakura, F. Toda, and Y. Torii, *Tetrahedron*, 23, 3363 (1967);
(b) K. Hubner, F. Kollinsky, G. Mardert, and H. Pennewiss, *Angew, Makromol, Chem.*, 11, 109 (1970);
(c) L. D. Taylor and T. E. Platt, *J. Polym. Sci., Polym. Letters Edit.*, 7, 597 (1969);
particularly with regard to the 5-membered rings, the 2-alkenyl-1,3-oxazolin-5-ones.

Typically, the amino acid is reacted with the acylating agent (e.g., (meth)acryloylchloride or (meth)acrylic anhydride) in the presence of a base (e.g., aqueous sodium hydroxide) to produce the acylated amino acid. Cyclization to the azlactone is then accomplished in the presence of a dehydrating agent (e.g., acetic anhydride, ethyl chloroformate, or dicyclohexylcarbodiimide).

Examples of suitable alkenyl azlactones are:
2-ethenyl-1,3-oxazolin-5-one
2-ethenyl-4-methyl-1,3-oxazolin-5-one,
2-isopropenyl-1,3-oxazolin-5-one,
2-isopropenyl-4-methyl-1,3-oxazolin-5-one,
2-ethenyl-4,4-dimethyl-1,3-oxazolin-5-one,
2-isopropenyl-4,4-dimethyl-1,3-oxazolin-5-one,
2-ethenyl-4-methyl-4-ethyl-1,3-oxazolin-5-one,
2-isopropenyl-4-methyl-4-butyl-1,3-oxazolin-5-one,
2-ethenyl-4,4-dibutyl-1,3-oxazolin-5-one, 2-isopropenyl-4-methyl-4-dodecyl-1,3-oxazolin-5-one,
2-isopropenyl-4,4-diphenyl-1,3-oxazolin-5-one,
2-isopropenyl-4,4-pentamethylene-1,3-oxazolin-5-one
2-isopropenyl-4,4-tetramethylene-1,3-oxazolin-5-one
2-ethenyl-4,4-diethyl-2-oxazolin-5-one,
2-ethenyl-4-methyl-4-nonyl-2-oxazolin-5-one,
2-isopropenyl-4-methyl-4-phenyl-2-oxazolin-5-one,
2-isopropenyl-4-methyl-4-benzyl-2-oxazolin-5-one,
2-ethenyl-4,4-pentamethylene-2-oxazolin-5-one.

The PSA's of this invention made with alkenyl azlactones are energy curable. By energy curable, it is meant that the polymers undergo a crosslinking insolublizing reaction when exposed to activating radiation. The activating radiation can either be thermal, electromagnetic (e.g. ultraviolet) or ionizing (e.g. electron beam). This operation is called post curing and may be performed on extruded sheet material after it exits the wiped surface reactor to help give the PSA's good bond strength and toughness. The post curing process is explained in U.S. Pat. No. 4,304,705 at column 7-9 and column 17-18, and the electron beam post curing process is further explained in U.S. Pat. No. 3,725,115 in which the radiation dosage is about 0.5 to 12 megarads.

Macromer Preparation

As disclosed in U.S. Pat. Nos. 3,786,116 and 3,842,059, a macromer is prepared by anionic polymerization of a monomer to form a living polymer. Monomers useful for such purposes include vinyl containing compounds such as styrene and alpha-methyl styrene. Living polymers are prepared by contacting such a monomer with an alkali metal hydrocarbon (e.g. n-butyllithium) or alkoxide salt in the presence of an inert organic diluent (a hydrocarbon or an ether).

The anionic polymerization for formation of the macromer may be terminated in several ways. One method is to cap the living anion with a less reactive end group prior to actual termination. Suitable capping agents include the lower alkylene oxides such as ethylene oxide. Capping is followed by protonating the alkoxide ion to produce an hydroxyl terminated polymer. The hydroxyl group is then allowed to react with a terminating agent containing an isocyanate group such as isocyanato alkyl methacrylates to produce vinyl termination.

One macromer is a methacrylate terminated polystyrene having an average molecular weight of about 20,000. This is prepared using a flame-dried 5 liter glass 5-necked flask equipped with an agitator, gas inlet, condenser, addition funnel and thermometer and purged with dry argon. This flask is charged with about 2,100 grams of cyclohexane previously distilled from polystyryl lithium. The cyclohexane is heated to about 50° C., and 20 ml of a 1.17 molar solution of sec-butyllithium in cyclohexane (23.4 millimoles) are added to the flask via a syringe. Purified styrene monomer (about 350 g) is added to the flask, resulting in an exothermic reaction. The temperature is maintained at less than 74° C. by cooling during the initial exotherm, and then, during the next hour, the reaction mixture is maintained at approximately 50° C. Thereafter, the mixture is cooled to about 40° C., and ethylene oxide previously passed over sodium hydroxide is introduced with vigorous mixing until the red color of polystyryl lithium has changed to a faint yellow color. Then the reaction is quenched with 1.4 g of acetic acid. The reaction mixture is saturated with dry air, and about 10.9 g of 2-isocyanatoethyl methacrylate and 4 drops of tin dioctoate catalyst are added, and the resultant mixture is heated to 60° C. and maintained at that temperature for 14 hours.

The mixture is then cooled and the polymer is precipitated in 30 liters of methanol and dried in vacuo to yield a methacrylate terminated polystyrene macromer. To produce methacrylate terminated polystyrene macromer of a lower molecular weight (e.g. 10,000) the same procedure is used except the amounts of lithium initiator and styrene monomer are changed to produce a macromer of about half the molecular weight described above.

Macromers such as those described above are reacted with acrylic monomers such as those already described to form the inventive copolymers. In one class of such copolymers, the total of both the modifying monomer (as described in section entitled Disclosure of Invention) and the macromer comprises about 4 to 30 weight percent of the total weight of all monomers in the copolymer.

Macromer used in reducing the invention to practice was typically an acrylate or methacrylate terminated polystyrene of about 10,000 molecular weight. About 8 to 30 weight percent coupled material was sometimes present in the samples used. Coupled material was of the same composition as the macromer but had roughly two or four times its molecular weight.

The invention will be further clarified by consideration of the following examples which are intended to be purely exemplary. In these examples, the term $M_w$ means weight average molecular weight, and the term $M_n$ means number average molecular weight, both of which are terms well understood in the polymer art. The term p designates polydispersity which is the ratio of $M_w/M_n$.

Test Methods and Parameters

The characterization of the molecular weight distribution of polymers has been done by size exclusion chromatography, also known as gel permeation chromatography (GPC). GPC test methods are explained in *Modern Size Exclusion Liquid Chromatography, Practice of Gel Permeation Chromatography,* John Wiley & sons, 1979.

Viscosity of the soluble portion of the inventive polymers was measured as inherent viscosity (IV) in dilute solutions using tetrahydrofuran solvent. Inherent viscosity was measured by conventional means in a water bath controlled at about 30° C.

Percent insolubles or gel in the polymer was measured by 20 hour extraction in boiling tetrahydrofuran unless otherwise noted. A polymer sample was placed in a tared filter paper sack which was tied shut and immersed for 20 hours in boiling THF in a Soxhlet extractor. That fraction of the polymer which was not dissolved (i.e. remained on the filter paper) after such treatment was considered to be insoluble.

Gel can be virtually eliminated in some cases by using the pressure feed already described; the multi-part initiators: and a water cooled extruder barrel. Esters of methacrylates are believed to produce polymers having less gel than acrylate esters, but they do not generally perform as well as acrylates do as PSA's. Gel may also be reduced by lowering residence time and by using carbon tetrabromide as a chain transfer agent.

When initiator concentrations are reported as percents, that means weight percent based on the total monomer weight in the system being 100%. Percent of monomers is by weight.

The compliance of the adhesives have been compared quantitatively by the following peel adhesion test: A strip of 1.25 centimeters (½ inch) wide sheet material, preferably 40 microns (1.6 mil) polyester film, is provided with a 38 micron (1.5 mil) coating of adhesive and placed adhesive face down on a clean horizontal glass plate. The strip (which is conveniently about 45 centimeters long) is pressed into adhesive contact with the glass by passing a hard rubber roller weighing 2.1 kilograms (4.5 pounds) over the strip at a rate of about 3.8 centimeters per second. One end of the strip is attached to a suitable scale and the glass plate is moved away from the scale at a rate of about 3.8 centimeters per second. The portion of the tape removed comes back adjacent but not quite touching the portion still adherently attached (hence the test can be referred to as a 180° peel adhesion test). The scale reading is a measure of the adhesion to the glass. The average is reported from replicate tests in all cases.

The cohesive strengths of the adhesives have been compared by means of the following shear strength test: The test is run using a tape having a 38 micron (1.5 mil) layer of the adhesive on paper, polyester film or any other suitable flexible backing material. A 1.25 centimeter (½ inch) wide strip of the tape is placed adhesive side toward an essentially vertical stainless steel plate (the face of the steel plate to which the tape is adhered being angled upward approximately two degrees to prevent peeling of the tape away from the panel) so that they overlap each other by 1.25 centimeter (½ inch), resulting in a mutual adhesive contact area of 1.25 centimeters by 1.25 centimeters (½ inch by ½ inch). The tape and the stainless steel plate are pressed into contact by passing a hard rubber roller weighing 2.1 kilograms (4.5 pounds) over this contacting area at about 3.8 centimeters per second and the bond is then tensioned by the application of a force of 1,000 grams applied as a weight hanging from the tape. The time required for the tape to separate from the steel plate is measured and recorded as the shear strength of the adhesive.

Pressures given in the Examples are gauge pressures.

EXAMPLE 1

A process similar to that described previously with regard to FIG. 1 was used to react a premix containing about 92 percent isooctylacrylate with about 4 percent acrylic acid and about 4 percent methacrylate terminated polystyrene macromer having a molecular weight of about 10,000, using an initiator of 0.16 percent methyltricaprylyl ammonium persulphate (QAP) and 0.20 percent Lupersol 101. The 34 mm diameter laboratory counter rotating twin screw extruder was used as the reactor. It had a maximum rotational speed of 250 rpm and a maximum power of 10 horsepower at 15 amps. The pitch of the extruder screw in the feed section varied from 12 mm to 6 mm and was 6 mm in the last 8 screw sections. Actual feed temperature was about 52° C. and feed pressure was about 24 psi (165 kiloPascals, kPa). Output of the wiped surface reactor was about 92 grams/min. The extruder rotational speed during the reaction was about 60 rpm, and it drew a current of about 7.5 amps. A temperature profile of the counter rotating twin screw extruder is given in Table 1 below.

TABLE 1

| Barrel Section | Temperature (°C.) | Pressure kPa |
|---|---|---|
| 1 | 70 | |
| 2 | 80 | 200 |
| 3 | 90 | |
| 4 | 100 | |
| 5 | 110 | |
| 6 | 120 | |
| 7 | 130 | |
| 8 | 140 | 10,600 |
| 9 | 135 | 20,800 |
| end block* | 150 | 18,600 |

*Electrical resistance band heater wrapped around end block.

The product obtained had the following properties: inherent viscosity of 1.58, conversion to polymer of about 98 percent, and about one percent insolubles.

GPC requires that the polymer be soluble, and therefore, only the portion of the polymers soluble in the GPC THF carrier solvent was so analyzed. The term GPC insolubles is different from THF gel and refers to the fraction of the chromatograph sample which failed to pass through a 0.2 micrometer filter prior to injection into the chromatograph column. Samples were prepared for GPC as follows: (1) Each polymer sample was dissolved at a concentration of 2 mg/ml in tetrahydrofuran at room temperature to make a total of about 10 ml. of solution. (2) This solution was treated with saturated solution of diazomethane in tetrahydrofuran by adding 5 ml of such solution drop-wise while stirring. (3) The resulting mixture was heated under a nitrogen atmosphere evaporated to dryness. (4) Tetrahydrofuran was used to dissolve the residue and bring sample volume up to 10 ml. (5) The resulting fluid was filtered through a 0.2 micrometer Fluoropore filter (by Millipore Corp.) in a syringe to prevent plugging of the GPC column by the sample. (6) The resulting filtrate was used for chromatographic analysis was so analyzed.

The polymers of this invention have a substantial fraction of GPC insolubles. GPC insolubles are substantial if their concentration is over 15%. Because of the GPC insolubles concentration, it is believed that the polymers of this invention have a higher degree of branching than such acrylate PSA's made by solution processes.

The use of larger extruders is generally preferred because it is believed that they cause the formation of less gel than smaller diameter machines.

A polymer syrup may also be used as the raw material for the inventive process. Polymer syrups comprise a partially reacted mixture of the acrylate monomers, having reached a conversion typically of about 5 to 10%. The use of polymer syrups to make acrylic polymers is explained in U.S. Pat. No. 4,181,752, see especially Column 5, lines 42-56, Column 10, and example 23-25. The viscosity of polymer syrup can be so great as to eliminate the requirement for pressure feed to the reactor. The premix can be made by mixing the syrup, the initiators and the macromer or alkenyl azlactone and feeding to the reactor from a nitrogen purged hopper placed above the reactor feed port.

EXAMPLE 2

The same extruder as described in Example 1 was used to perform the inventive process using a three-part initiator. The raw materials were:

| | | |
|---|---|---|
| isooctylacrylate | 18,420 g | 92% |

| -continued | | |
|---|---|---|
| acrylic acid | 980 g | 5% |
| methacrylate terminated polystyrene (about 10,000 molecular weight) | 600 g | 3% |
| initiator: | | |
| methyltricaprylyl ammonium persulfate | 22.2 g | |
| azobisisobutyronitrile | 3.28 g | |
| Lupersol 101 | 46.4 g | |

The twin screw extruder was operated at 60 rpm and produced 57–69 g/min. of polymeric material. A temperature and pressure profile of the extruder is given in Table 2 below:

TABLE 2

| Zone | Temperature (°C.) | Pressure (KPa) |
|---|---|---|
| Feed | 52 | 207 |
| 1 | 80 | 190–240 |
| 2 | 70 | 200–240 |
| 3 | 70 | 200–240 |
| 4 | 89 | 214–250 |
| 5 | 90 | 180–214 |
| 6 | 115 | 220–250 |
| 7 | 150 | 4380–5980 |
| 8 | 150 | 4470–6570 |
| 9 | 150 | |
| end block | 150 | |
| hose | 150 | |

The product had the following properties:

| inherent viscosity | 0.775 |
|---|---|
| conversion | 96.8% |
| gel | 8.0% |
| $M_n$ | 41,000 |
| $M_w$ | 424,000 |

EXAMPLE 3

The polymerization porcess of this invention was performed for two separate run (runs no. 294 and 296) unsig 2-ethenyl-4,4-dimethyl-1,3-oxazolin-5-one (an alkenyl azlactone) to make the terpolymer instead of macromer. The raw materials for both runs are as follows:

| isooctyacrylate | 90% |
|---|---|
| acrylic acid | 10% | alkenyl azlactone 4% of the total weight of the isooctylacrylate and acrylic acid monomers.

The initiator used was: methyltricaprylyl ammonium persulfate 0.010 mole percent; azobisisobutyronitrile 0.010 mole percent and t-butylperbenzoate 0.080 mole percent.

The properties of the polymeric materials produced are shown in Table 3 below.

TABLE 3

| Run | RPM | % Conversion | IV | Mw | Mn | p | % Gel |
|---|---|---|---|---|---|---|---|
| 294 | 150 | 96.3 | 0.426 | 469,000 | 42,000 | 11.27 | 3.01 |

TABLE 3-continued

| Run | RPM | % Conversion | IV | Mw | Mn | p | % Gel |
|---|---|---|---|---|---|---|---|
| 296 | 100 | 97.2 | 0.786 | 1,082,000 | 77,000 | 14.04 | 3.1 |

Samples of runs 294 and 296 were coated onto substrates by hot melt coating at a coating weight of 6 grains per 4×6 inch sample. Various degrees of electron beam exposure were used to post cure the samples. The tape properties were then measured and are shown in Table 4 below.

TABLE 4

| Run | Time | Shear min/½" | Post Cure Electron Beam Intensity MRads |
|---|---|---|---|
| 294 | initial | 4.4 | — |
| | 20 hrs.* | 5.5 | |
| 294 | initial | 26.6 | 3 |
| | 20 hrs.* | 108.6 | 3 |
| 294 | initial | 149 | 6 |
| | 20 hrs.* | 200 | 6 |
| 296 | initial | 0.75 | — |
| | 20 hrs.* | 1.2 | — |
| 296 | initial | 16.85 | 3 |
| | 20 hrs.* | 16.5 | 3 |
| 296 | initial | 23.8 | 6 |
| | 20 hrs.* | 13.0 | 6 |

*Left on substrate 20 hours before testing, with no post curing after the initial post cure.

For run 294, in each case where there was electron beam post curing, a marked increase in the shear value of the adhesive is shown 20 hours after the initial application. The relative decreases in shear value for run 296 are felt to be due to its higher molecular weight.

Within about the first hour after the inventive adhesive has been applied to a paper substrate it can be removed without damaging the paper, although it will stay in position on the paper. However, bond strength increases greatly with the passage of time to form a strong, permanent bond.

EXAMPLE 4

In experiments similar to those described in Example No. 3, the effect of varying acrylic acid concentration was studied by keeping azlactone (2-ethenyl-4,4-dimethyl-1,3-oxazolin-5-one), concentration constant at 4% by weight of the premix, and varying the acrylic acid concentration between 10 and 14 percent by weight. All three runs were made with the laboratory counter rotating twin screw extruder running at about 70 rpm, and the temperature profile is given in Table 5 below.

TABLE 5

| Zone | Feed | 1 | 2 | 3 | 4 | 5 | 6 | 7 | 8 | 9 | end block |
|---|---|---|---|---|---|---|---|---|---|---|---|
| Temperature (°C.) | 52 | 80 | 70 | 70 | 90 | 90 | 115 | 150 | 150 | 150 | 150 |

In addition to the heated hose set at about 150° C. which was used in Example 2, runs 734–736 were pumped by a heated die pump (also at 150° C.) through a second heated hose at the same temperature to a container for collection.

The polymeric products of these runs are characterized in Tables 6 and 7.

TABLE 6

| Run | Isooctylacrylate/ acrylic acid/ azlactone weight ratio | Output g/min | IV | % Conversion | % Gel |
|---|---|---|---|---|---|
| 734 | 86/10/4 | 81 | 0.700 | 96.7 | 4.0 |
| 735 | 84/12/4 | 92 | 0.846 | 97.5 | 6.4 |
| 736 | 82/14/4 | 85 | 0.634 | 96.9 | 2.6 |

TABLE 7

| Run | Peel Adhesion ounces/½" Initial | Peel Adhesion ounces/½" 20 hr. | Shear min/½" |
|---|---|---|---|
| 734 | 30 | 52 | 96 |
| 735 | 3 | 22 | 376 |
| 736 | 1 | 15 | 650 |

The extent of the increase in adhesion is illustrated by the peel adhesion tests on these runs shown in Table 7 above. The coating for the tests in Table 7 was done by the hot melt method.

To show the feasibility of the inventive polymers having pendant azlactone moieties as positionable adhesives, the following test was performed. Typing paper was placed on a sample of each of the coating runs, 734–736. Good removability was seen (i.e. the paper could be peeled from the adhesive without delaminating or picking.) This showed one-sided positionability. The adhesive was then transferred to the typing paper. Two-sided positionability was checked by placing another sheet of typing paper on top of the adhesive laminated typing paper. Again, limited holding strength was seen. The second sheet of paper could be easily peeled away from the first without delamination, and it could be adhered permanently by the application of pressure. Also, leaving samples overnight where no pressure had been applied, resulted in a permanent bond.

The PSA compositions prepared in accordance with the present invention are coated on flexible or inflexible backing materials by conventional hot melt coating techniques to produce coated adhesive sheet materials. Typical examples of flexible backing materials are: paper and plastic films such as polypropylene, polyethylene, polyvinylchloride, polyester, cellulose acetate and ethyl cellulose. Backings may also be prepared from fabric such as woven fabric made of nylon, cotton, rayon, glass, ceramic fibers, or non-woven fabric. The backing may also be formed of metal, metallized polymeric films, or ceramic sheet materials. The coated sheet materials may take the form of any article conventionally known to be utilized with PSA compositions such as labels, tapes, signs and covers.

Thus, this invention includes within its scope a sheet material comprising a backing member and a coating covering at least a portion of one major surface thereof, which coating comprises a normally tacky and pressure sensitive adhesive of this invention as described above. It is believed that in such sheet materials the inventive PSA's will have a decreased tendency to diffuse into or migrate through any adjacent polymeric layers, as compared to similar polymers made by solution processes.

The process and adhesives described herein may be used to manufacture pressure sensitive adhesive tape. Fillers, tackifiers, colored pigments, opacifiers and others known adhesive tape ingredients may be incorporated into such tapes.

Other embodiments of this invention will be apparent to those skilled in the art from a consideration of this specification or practice of the invention disclosed herein. Various ommisions, modifications and changes to the principles described herein may be made by one skilled in the art without departing from the true scope and spirit of the invention which is indicated by the following claims:

What is claimed is:

1. A process of making a pressure sensitive adhesive composition by bulk polymerizing one or more free radical polymerizable vinyl compounds with one or more macromer represented by the general formula $X-(Y)_{n1}-Z$ wherein X is a copolymerizable vinyl group;

Y is a divalent linking group where $n_1$ can be 0 or 1; and

Z is a monovalent polymer moiety having the general formula

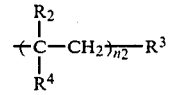

wherein $R^2$ is hydrogen or a lower alkyl group, $R^3$ is a lower alkyl group, $n_2$ is an integer from 40 to 500 and $R^4$ is

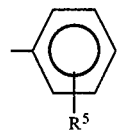

wherein $R^5$ is hydrgen or a lower alkyl group; which process comprises:

(a) continuously feeding to a wiped surface reactor, comprising a vessel and at least one rotor inside the vessel having a wiping portion located close to the inside surface of the vessel and a root portion spaced substantially further from said inside surface than the wiping portion wherein the root surface is wiped continuously during rotation of the rotor, raw materials which comprise unpolymerized vinyl compound without any substantial amount of polymerized vinyl compound, the macromer, and at least one initiator for free radical polymerization under the following conditions:

(i) all raw materials being fed substantially free of oxygen, and (ii) at least one raw material being a liquid unpolymerized vinyl compound having a viscosity less than about 4,000 centipoise which is fed under a pressure at least as high as the vapor pressure of the combined raw materials at the temperature to which the exotherm of the free radical polymerization brings them in the reactor;

(b) reacting the raw materials to desired conversion; and (c) continuously withdrawing a polymeric material from the reactor.

2. The process of claim 1 wherein the feed pressure of part (ii) is at least about 200 kiloPascals absolute.

3. The process of claim 1 wherein the raw materials are fed to the reactor without diluents or solvents.

4. The process of claim 1 in which the vinyl compounds, additional compounds, and initiators are mixed together to form a premix prior to feeding them to the reactor, and in which said premix is a liquid.

5. The process of claim 1 wherein the vinyl compounds are selected from the group consisting of ethylacrylate, 2-ethylhexyl acrylate, 2-ethylhexyl methacrylate, lauryl methacrylate, methylbutylacrylate, n-butylacrylate, butylmethacrylate, isooctylacrylate, n-octylmethacrylate, acrylic acid, acrylamide, acrylonitrile, methacrylonitrile, vinyl acetate, N-substituted acrylamides, hydroxyacrylates, N-vinylpyrrolidone, maleic anhydride, styrene, itaconic acid and mixtures thereof.

6. The process of claim 5 wherein the initiator is selected from the group consisting of azobisisiobutyronitrile; 2,5-dimetyl-2,5-di (t-butylperoxy)hexane; methyltricaprylyl ammonium persulfate; bis (4-t-butylclohexyl) peroxydicarbonate; lauroyl peroxide; t-butyl perbenzoate; t-butyl hydroperoxide; 2,5-dimethyl-2,5-di(t-butylperoxy)hex-3-yne; and di-t-butyl diperoxyphthalate.

7. The process of claim 1 wherein the raw materials in step (a) included a chain transfer agent selected from the group consisting of: carbon tetrabromide, hexabromoethane, bromotrichloromethane, 2-mercaptoethanol, t-dodecylmercaptan, isooctyl thioglycolate, cyclohexanone, and cumene.

8. The process of claim 1 in which the Z moiety of the macromer is characterized by: a glass transition temperature greater than about 20° C., a weight average molecular weight between about 2,000 and 30,000, and being unreactive under the conditions of the polymerization process.

9. The process of claim 1 in which $R^4$ is a phenyl radical and $R^5$ is hydrogen.

10. The process of claim 1 wherein the residence time of the reactants in the wiped surface reactor is from about one to 20 minutes.

11. The process of claim 10 wherein the wiped surface reactor discharges into a non-wiped surface reactor, and the desired conversion is reached at the discharge of the non-wiped surface reactor.

12. The process of claim 1 wherein the wiped surface reactor is an intermeshing twin screw extruder.

13. The process of claim 12 wherein the wiped surface reactor is a counter rotating twin screw extruder.

14. The process of claim 12 wherein the process further comprises extruding the polymeric material in sheet form and exposing it to post curing radiation.

15. The process of claim 12 which further comprises coating the polymeric material which is withdrawn from the reactor onto a substrate at the end of the twin screw extruder.

16. A pressure senstive adhesive acrylate polymer having a backbone comprised of a major portion derived from at least one alkyl ester of acrylic or methacrylic acid, the alkyl group of which contains from about four to 12 carbon atoms and having attached to said backbone moieties derived from at least one macromer represented by the general formula $X-(Y)_{n_1}-Z$ wherein X is a copolymerizable vinyl group;
Y is a divalent linking group where $n_1$ can be 0 or 1; and
Z is a monovalent polymer moiety having the general formula

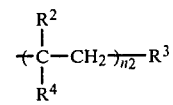

wherein $R^2$ is a hydrogen atom or a lower alkyl group, $R^3$ is a lower alkyl group, $n_2$ is an integer from 40 to 500 and $R^4$ is

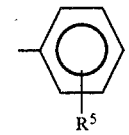

and $-CO_2R^6$
wherein $R^5$ isa hydrogen atom or lower alkyl group; which acrylate polymer is characterized by:
(a) monomeric units about 70 to 99 percent of which are derived from the alkyl esters of acrylic acid or methacrylic acid; and
(b) a degree of polymer branching indicated by a substantial fraction of GPC insolubles comprising more than about 15 percent of the total polymer.

17. The acrylate polymer of claim 16 which is further comprised of a minor portion derived from at least one modifying monomer selected from the group consisting of acrylic acid, methacrylic acid, acrylamide, acrylonitrile, methacrylonitrile, vinyl acetate, N-substituted acrylamides, hydroxyacrylates, N-vinylpyrrolidone, maleic anhydride, styrene, itaconic acid and mixtures thereof.

18. The acrylate polymer of claim 17 in which the Z moiety of the macromer is characterized by: a glass transition temperature greater than about 20° C., a weight average molecular weight between about 2,000 and 30,000, and being unreactive under the conditions of the polymerization process.

19. The acrylate polymer of claim 17 in which $R^4$ is a phenyl radical and $R^5$ is hydrogen.

20. The acrylate polymer of claim 17 wherein the alkyl ester of acrylic or methacrylic acid is selected from 2-ethylhexyl acrylate, 2-ethylhexyl methacrylate, lauryl methacrylate, methylbutylacrylate, n-butylacrylate, butylmethacrylate, isooctylacrylate, n-octylmethacrylate and mixtures thereof.

21. A pressure sensitive adhesive article on which the adhesive is comprised at least in part of the polymer of claim 20.

22. The pressure sensitive adhesive acrylate polymer of claim 16 which is a positionable pressure sensitive adhesive.

23. The process of claim 1 wherein the divalent linking group Y has the following formula

24. A process of making a pressure sensitive adhesive composition by bulk polymerizing one or more free radical polymerizable vinyl compounds with one or more macromer represented by the general formula $X-(Y)_{n_1}-Z$ wherein X is a copolymerizable vinyl group;
Y is a divalent linking group where nl can be 0 or 1; and Z is a monovalent polymer moiety having the general formula

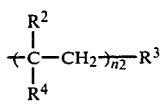

wherein $R^2$ is hydrogen or a lower alkyl group, $R^3$ is a lower alkyl group, $n_2$ is an integer from 40 to 500 and $R^4$ is

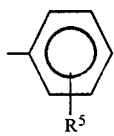

wherein $R^5$ is hydrgen or a lower alkyl group; which process comprises:
  (a) continuously feeding to a wiped surface reactor, comprising a vessel and at least one rotor inside the vessel having a wiping portion located close to the inside surface of the vessel and a root portion spaced substantially further from the inside surface than the wiping portion wherein the root surface is wiped continuously during rotation of the rotor, raw materials which comprise a polymer syrup comprising at least one partially reacted vinyl monomer having been stabilized at a conversion of about 5 to 10 percent, the macromer, and at least one initiator for free radical polymerization, said raw materials being substantially free of oxygen;
  (b) reacting the raw materials to desired conversion; and
  (c) continuously withdrawing a polymeric pressure sensitive adhesive material from the reactor.

25. A process of bulk polymerizing one or more free radical polymerizable vinyl compounds with at least one alkenyl azlactone from the class of 2-alkenyl-1,3-oxazolin-5-ones having the general formula:

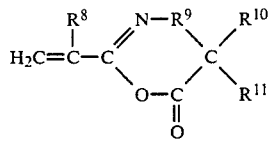

wherein $R^8$ is hydrogen, chloride, or a methyl group; $R^9$ is a single bond or a methylene or ethylene group, the last two of which may have substituents comprising an alkyl group having 1 to 6 carbon atoms or a phenyl group; and $R^{10}$ and $R^{11}$ are independently hydrogen, an alkyl or cycloalkyl group having 1 to 12 carbon atoms, an aryl or aralkyl group having 6 to 12 carbon atoms, or $R^{10}$ and $R^{11}$ taken together with the carbon atom to which they are attached form a 5-to 12-membered carbocyclic ring; which process comprises:
  (a) continuously feeding to a wiped surface reactor, comprising a vessel and at least one rotor inside the vessel having a wiping portion located close to the inside surface of the vessel and a root portion spaced substantially further from said inside surface than the wiping portion wherein the root surface is wiped continuously during rotation of the rotor, raw materials which comprise unpolymerized vinyl compound without any substantial amount of polymerized vinyl compound, the alkenyl azlactone and at least one initiator for free radical polymerization under the following conditions:
    (i) all raw materials being fed substantially free of oxygen, and
    (ii) at least one raw material being a liquid unpolymerized vinyl compound having a viscosity less than about 4,000 centipoise which is fed under a pressure at least as high as the vapor pressure of the combined raw materials at the temperature to which the exotherm of the free radical polymerization brings them in the reactor;
  (b) reacting the raw materials to desired conversion; and
  (c) continuously withdrawing a polymeric material from the reactor.

26. The process of claim 25 wherein the vinyl compounds are selected from the group consisting of ethylacrylate, 2-ethylhexyl acrylate, 2-ethylhexyl methacrylate, laurylmethacrylate, methylbutylacrylate, n-butylacrylate, butylmethacrylate, isooctylacrylate, isooctylacrylate, n-octylmethacrylate, acylic acid, acrylamide, acrylonitrile, methacrylonitrile, vinylacetate, N-substituted acrylamides, hydroxyacrylates, N-vinylpyrrolidone, maleic anhydride, styrene, itaconic acid and mixtures thereof.

27. The process of claim 26 wherein the initiator is selected from the group consisting of: azobisisobutyronitrile; 2,5-dimethyl-2,5-di(ti-butylperoxy)hexane; methyltricaprylyl ammonium persulfate; bis(4-t-butylcyclohexyl) peroxydicarbonate; lauroyl peroxide; t-butyl perbenzoate; t-butyl hydroperoxide; 2,5-dimethyl-2,5-di-(t-butylperoxy)hex-3-yne; and di-t-butyl diperoxyphthalate.

28. The process of claim 26 wherein the wiped surface reactor is an intermeshing twin screw extruder.

29. The process of claim 28 which further comprises extruding the polymeric material in sheet form and exposing it to post curing radiation.

30. An acrylate polymer having a backbone comprised of a major portion derived from at least one alkyl ester of acrylic or methacrylic acid, the alkyl group of which contains from about three to 14 carbon atoms and having attached to said backbone moieties derived from at least one alkenyl azlactone from the class of 2-alkenyl-1,3-oxazolin-5-ones having the general formula

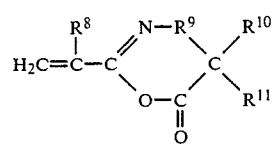

wherein $R^8$ is hydrgoen, chloride, or a methyl group $R^9$ is a single bond or a methylene or ethylene group, the last two of which may have substituents comprising an alkyl group having 1 to 6 carbon atoms or a phenyl group; and $R^{10}$ and $R^{11}$ are independently hydrogen, an alkyl or cycloalkyl group having 1 to 12 carbon atoms, an aryl or aralkyl group having 6 to 12 carbon atoms, or $R^{10}$ and $R^{11}$ taken together with the carbon atom to which they are attached form a 5-to 12-membered carbocyclic ring;

which acrylate polymer is characterized by:
(a) monomeric units about 70 to 99 percent of which are derived from the alkyl esters of acrylic acid or methacrylic acid; and
(b) a degree of polymer branching indicated by a substantial fraction of GPC insolubles comprising more than about 15 percent of the total polymer.

31. The acrylate polymer of claim 30 which is further comprised of a minor portion derived from at least one modifying monomer selected from the group consisting of acrylic acid, methacrylic acid, acrylamide, acrylonitrile, methacrylonitrile, vinyl acetate, N-substituted acrylamides, hydroxyacrylates, N-vinylpyrrolidone, maleic anhydride, styrene, itaconic acid and mixtures thereof.

32. The acrylate polymer of claim 31 wherein the alkyl ester of acrylic or methacrylic acid is selected from 2-ethylhexyl acrylate, 2-ethylhexyl methacrylate, lauryl methacrylate, methylbutylacrylate, n-butylacrylate, butylmethacrylate, isoctylacrylate, n-octylmethacrylate and mixtures thereof.

33. A pressure sensitive adhesive article on which the adhesive is comprised at least in part of the polymer of claim 32.

34. A process of making a pressure sensitive adhesive composition by bulk polymerizing one or more free radical polymerizable vinyl compounds with one or more alkenyl azlactone-; which process comprises:
(a) continuously feeding to a wiped surface reactor, comprising a vessel and at least one rotor inside the vessel having a wiping portion located close to the inside surface of the vessel and a root portion spaced substantially further from the inside surface than the wiping portion wherein the root surface is wiped continuously during rotation of the rotor, raw materials which comprise a polymer syrup comprising at least one partially reacted vinyl monomer having been stabilized at a conversion of about 5 to 10 percent, the alkenyl azlactone, and at least one initiator for free radical polymerization, said raw materials being substantially free of oxygen;
(b) reacting the raw materials to desired conversion; and
(c) continuously withdrawing a polmeric pressure sensitive adhesive material from the reactor.

* * * * *